J. H. DALLMEYER.
LENS FOR PHOTOGRAPHIC PORTRAITURE.

No. 65,729.  Patented June 11, 1867.

Witnesses.
Jno. Alcock
Geo. Pitt

Inventor.
J. H. Dallmeyer

United States Patent Office

JOHN HENRY DALLMEYER, OF LONDON, ENGLAND.

*Letters Patent No.* 65,729, *dated June* 11, 1867.

---

COMPOUND LENS FOR PHOTOGRAPHIC PORTRAITURE.

---

The Schedule referred to in these Letters Patent and making part of the same.

---

TO ALL TO WHOM IT MAY CONCERN:

Be it known that I, JOHN HENRY DALLMEYER, of 19 Bloomsbury street, in the county of Middlesex, England, optician, a subject of the Queen of Great Britain, have invented or discovered certain new and useful "Improvements in Compound Lenses Suitable for Photographic Uses;" and I, the said JOHN HENRY DALLMEYER, do hereby declare the nature of the said invention, and in what manner the same is to be performed, to be particularly described and ascertained in and by the following statement thereof; that is to say—

My invention relates to double combination and other lenses or objectives intended chiefly for portraiture, but also applicable for views and other pictures, and consists in arranging them so that the lenses composing one of the combinations are of such form and so positioned that by a slight variation of distance or separation between its elements, any desired amount of spherical aberration can be obtained, without at the same time materially deranging the other necessary corrections of a photographic objective or lens. With a lens or objective so constructed the operator can, by sacrificing intense sharpness of definition on one plane, distribute the definition over several planes, and so obtain a more artistic and pleasing result.

Figure 1:
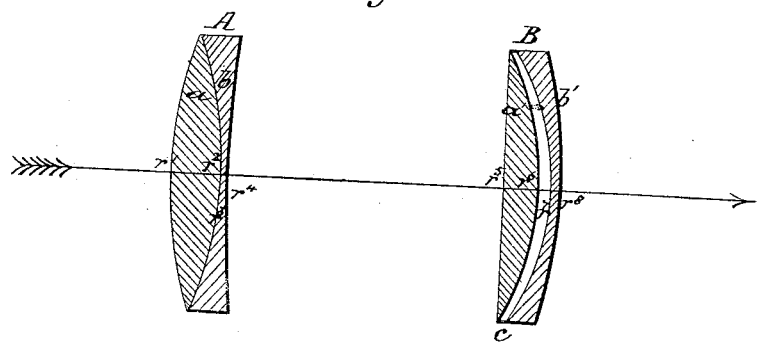

A double combination lens or objective may be constructed according to my invention, as is shown at Figure 1. It differs from double combination portrait lenses (such as that originally invented by Professor Petzval of Vienna, and shown at Figure 2,) in that the lenses composing the back combination are reversed, both as regards their order of position and form, i. e., the flint-glass lens is exterior or nearest the screen or image, and the crown-glass lens is nearest to or faces the front combination, whilst at the same time the radii of curvatures of the adjacent surfaces of the crown and flint-glass lenses are dissimilar, and suitable means are provided to alter the distance or separation between these two lenses at will. Then, for my new lens, the ratio of effective aperture of which is to the compound focal length of the entire combination as 1 : 3, the angle of field embraced about sixty degrees, and the image free from distortion, the details of construction are as follows, reference being made to the annexed diagram, fig. 1.

For a given compound or equivalent focal length, $f$, of the entire combination or objective, I construct two combinations, as A and B, both of the same diameter, equal to $f_{\gamma}$. The ratio of focal length of the anterior combination A is to the compound focus $f$ as 9 : 6, and the focal length of the back combination B is to A as 3 : 2. The front or anterior combination A is composed of a double-convex lens of crown glass, $a$, and a double-concave lens of flint glass, $b$. The radius of curvature of the anterior surface, $r_1$, of the crown lens $a$, is in proportion to the compound focus $f$ of the entire combination or objective as 1 . 2, and the external radius of curvature, $r_4$, of flint-glass lens $b$, is to $r_1$ as 5 . 1. The internal radii of curvature, $r_2$, of crown lens $a$, and $r_3$ of flint lens $b$ are, by preference, identical and cemented, and such that for the above focal length the combination A, by preference, is achromatic, or nearly so, which, for the qualities of glass employed by me, is the case when the ratio of radii between the anterior and internal surfaces, i. e., $r_1$ and $r_2$ of crown lens $a$, is as 31 : 27. At a distance equal to the diameter of the front combination A, is situated the posterior combination B, composed of two lenses, viz, of, by preference, a meniscus lens of crown glass, $a'$, with the concave surface facing the front combination, and of a concavo-convex lens of flint glass, $b'$, convex side outside or facing the screen of the camera, these two lenses having their adjacent surfaces dissimilar. The radius of curvature of the adjacent or internal convex surface, $r_6$, of crown lens $a'$, is in proportion to the radius of curvature of the anterior surface $r_1$ of crown lens $a$ as 2 : 3, and the posterior or external radius of curvature $r_8$ of flint lens $b'$, is to $r_1$ as 37 : 31. The radii of curvatures of the other two surfaces, viz, the concave surface $r_5$ of crown lens $a'$, and the concave surface $r_7$ of flint lens $b'$, are such, that for the above focal length and the lenses $a'$ and $b'$, by preference separated from each other, (i. e., the distance between the centres of their adjacent surfaces $r_6$ and $r_7$,) by an interval, $e$ equal to $f_{60}$, combination B is achromatic or actinic, or nearly so. For the qualities of glass employed by me, this is the case when the ratio of radii crown lens $a'$ is $r_6 : r_5$ as 1 : 16, and that of the flint-glass lens $b'$, $r_8 : r_7$ as 2 : 1 nearly.

The combination or objective constructed as above, without any diaphragm, and with the component lenses of combination B as separated above, viz, at a distance equal to $f_{60}$, is free from spherical and chromatic aberration for both the axial and oblique pencils, but by increasing the separation or distance between the lenses composing combination B, (between the limits, say of $f_{60}$ to $f_{20}$) suitable means, such as a screw, being provided for the purpose, the correction for spherical aberration for the entire combination or objective is thereby impaired for the moment to any required extent, or what may be termed diffusion of definition obtained to suit the wishes of the operator for the time being, without at the same time materially deranging the other necessary corrections of the lens or objective, and this has never been accomplished heretofore. I observe also that the particulars of dimensions and proportions given as above are those best suited to accomplish the particular object in view, but for other objects, such as a combination possessing greater intensity or rapidity, or one to have less intensity or rapidity than the combination herein described, other dimensions may be employed.

The improvements of my lens, constructed as above described, over existing double combination portrait lenses are these, viz:

First. Capability of adjustment at the will of the operator, to obtain for the moment any desired amount of distribution of definition over several planes, simply by an alteration in the distance or separation of the elements composing, as in the lens described, the back combination, without at the same time deranging the other necessary corrections of the entire objective.

Second. With the lenses composing the combination at their normal distance apart, more perfect correction of the oblique or marginal pencils for both the spherical and chromatic aberrations.

Third. Greater equality of illumination throughout the entire surface covered by the lens.

Fourth. Entire freedom from distortion without the aid of diaphragms, and greater flatness of field.

Fifth. Greater adaptability to varying purposes of one and the same lens or combination.

Sixth. Economy as regards the optical means employed.

Figure 2:
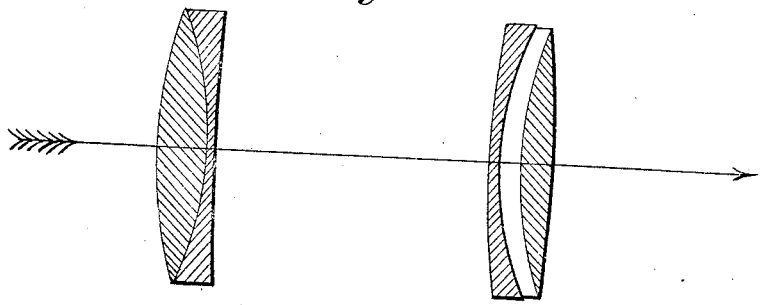

With the same object of regulating the spherical aberration at pleasure, a combination similarly constructed to the posterior combination in fig. 2, may be made to form part of other lenses or objectives composed of more than two combinations, such as the triplet. Also, (but less conveniently,) the regulation of the spherical aberration may be obtained by means of the anterior combination of a double combination, in which case the anterior combination is made with the adjacent surfaces of its elements of different curvatures, and with the flint lens outside or towards the view. Means are provided for slightly altering the distance between these elements at pleasure.

What I claim, is—

The construction of lenses or objectives suitable for photographic purposes, the component parts of which are of such form and so positioned that by a slight variation of distance between the lenses of one of the combinations (as by means of a screw-movement,) the operator can produce at will any desired amount of spherical aberrations or diffusion of focus, without at the same time materially deranging the other necessary corrections of a photographic lens, substantially as herein described.

I also claim the combining lenses $a\ a'\ b\ b'$, substantially as herein described.

J. H. DALLMEYER.

Witnesses:
G. F. WARREN, } Both of No. 17 Gracechurch Street, London.
JOHN DEAN,
JOHN HARRISON, *Notary Public.*